(12) United States Patent
Gaikwad

(10) Patent No.: US 9,606,892 B2
(45) Date of Patent: Mar. 28, 2017

(54) WORKFILE MONITOR

(71) Applicant: Bank of America, Charlotte, NC (US)

(72) Inventor: Deepak Gaikwad, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 585 days.

(21) Appl. No.: 14/151,570

(22) Filed: Jan. 9, 2014

(65) Prior Publication Data

US 2015/0195180 A1    Jul. 9, 2015

(51) Int. Cl.
*G06F 15/173*    (2006.01)
*G06F 11/34*    (2006.01)

(52) U.S. Cl.
CPC ...... *G06F 11/3485* (2013.01); *G06F 2201/80* (2013.01); *G06F 2201/81* (2013.01)

(58) Field of Classification Search
CPC ............ G06F 11/3485; G06F 2201/80; G06F 2201/81
See application file for complete search history.

(56) References Cited

U.S. PATENT DOCUMENTS

| | | | | |
|---|---|---|---|---|
| 7,720,802 B2* | 5/2010 | Christenson | .......... | G06F 9/5016 711/170 |
| 7,840,752 B2* | 11/2010 | Hu | .......... | G06F 12/023 707/705 |
| 9,141,526 B2* | 9/2015 | Iliadis | ................. | G06F 12/0246 |
| 2006/0074872 A1* | 4/2006 | Gordon | .............. | G06F 17/3048 |
| 2006/0074956 A1* | 4/2006 | Marwah | ............ | G06F 17/30312 |

OTHER PUBLICATIONS

IBM Manual—DB2 10 for z/OS Managing Performance, Nov. 2013, internet http://publib.boulder.ibm.com/epubs/pdf/dsnpgm09. pdf, pp. 1-1093.
Macro-Name=DSNDQWS1, Descriptive-Name=DB2, Self Defining Section Mapping Macro for Data Base Statistics (IFCID=0002), Licensed Materials—Property of IBM 5635-DB2, Copyright 1982, 2006 IBM Corp., pp. 1-3.
Macro-Name=DSNDQIST, Licensed Materials—Property of IBM 5605-DB2, Copyright 1982, 2010 IBM Corp., pp. 1-7.
Macro-Name=DSNDQW01, Descriptive—Name=IFC Mapping Macro for IFCIDS 0058-0139, Licensed Materials—Property of IBM 5605-DB2, Copyright 1982, 2010 IBM Corp., pp. 1-78.
Macro-Name=DSNDQW04, Descriptive—Name=IFC Mapping Macro for IFCIDS 0250-360, Licensed Materials—Property of IBM 5605-DB2, Copyright 1982, 2010 IBM Corp., pp. 1-108.

* cited by examiner

*Primary Examiner* — Krisna Lim
(74) *Attorney, Agent, or Firm* — Banner & Witcoff, Ltd.; Michael A. Springs

(57) ABSTRACT

Methods and apparatus for monitoring workfiles are disclosed. An authorized user or system programmer may input workfile threshold values and other monitoring information into a configuration file. A server reads the configuration file and starts traces to monitor workfile usage in a system. The server may continuously monitor the system to determine whether workfile usage in the system reaches workfile threshold values set in the configuration file. The server may list SQL queries using workfiles and then alert the system programmer when the threshold values are reached and is capable of reclaiming disk space by dropping and recreating overgrown workfiles with their original definitions.

17 Claims, 3 Drawing Sheets

WORKFILE MONITOR

TECHNICAL FIELD

Aspects of the disclosure relate generally to a Database Management System (DBMS). Specifically, aspects of the disclosure relate to a system for monitoring workfiles in a DB2 v10 architecture.

BACKGROUND

Database2 (DB2) is a relational database management system (DBMS). DB2 provides an open database environment that runs on a wide variety of computing platforms, including mainframes and large distributed platforms to smaller scale personal computers. Using Structured Query Language (SQL), users may create and edit tables in the DB2 to assess and manipulate data. An SQL query may cause DB2 to use existing workfiles, and if necessary create new workfiles to cater to the result set returned by the query. A workfile is a temporary storage area that that is generally created to store intermediate relations from SQL queries.

Workfiles containing a few hundred of data sets may be common in large databases. In DB2 v8, a capacity for all workfiles in a database is predefined, generally by a system programmer. Any user query requesting workfiles that exceed the predefined capacity fail in DB2 v8. However, in the DB2 v10 architecture, workfiles are defined with a secondary space that enables the workfiles to extend beyond a predefined capacity. While this feature allows for more workfile scalability, it also presents new problems. For instance, runaway queries requiring excessive workfiles may end up consuming all available disk space which, in turn, may cause transaction failures. Thus, there is a need for a system and method for monitoring workfile usage, alerting system programmers when a workfile threshold has been reached, and reclaiming disk space.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a computer-implemented method, comprising: receiving, at a processor, a workfile threshold value; monitoring, at the processor, the workfile usage in a database management system, wherein the workfile usage comprises the amount of workfile space used by SQL queries; comparing, at the processor, the workfile threshold value with the workfile usage to determine whether the workfile usage has reached the workfile threshold; and outputting, at the processor, a threshold alert when the workfile usage has reached the workfile threshold.

Certain other aspects disclose a non-transitory computer-readable storage medium having computer-executable program instructions stored thereon that, when executed by a processor, cause the processor to: receive a workfile threshold value; monitor the workfile usage in a database management system, wherein the workfile usage comprises the amount of workfile space used by SQL queries; compare the workfile threshold value with the workfile usage to determine whether the workfile usage has reached the workfile threshold; and output a threshold alert when the workfile usage has reached the workfile threshold.

Certain other aspects disclose an apparatus comprising: a memory; a processor, wherein the processor executes computer-executable program instructions which cause the processor to: receive a workfile threshold value; monitor the workfile usage in a database management system, wherein the workfile usage comprises the amount of workfile space used by SQL queries; compare the workfile threshold value with the workfile usage to determine whether the workfile usage has reached the workfile threshold; and output a threshold alert when the workfile usage has reached the workfile threshold.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain principles of the disclosure. In the drawings:

DETAILED DESCRIPTION

In accordance with various aspects of the disclosure, methods, non-transitory computer-readable media, and apparatuses are disclosed for monitoring workfile usage in a DBMS. In certain aspects, when a server receives data from a computing device, the server processes and analyzes the data. The automated process may utilize various hardware components (e.g., processors, communication servers, memory devices, and the like) and related computer algorithms to generate image data related to the agency's business data.

Figure 1:
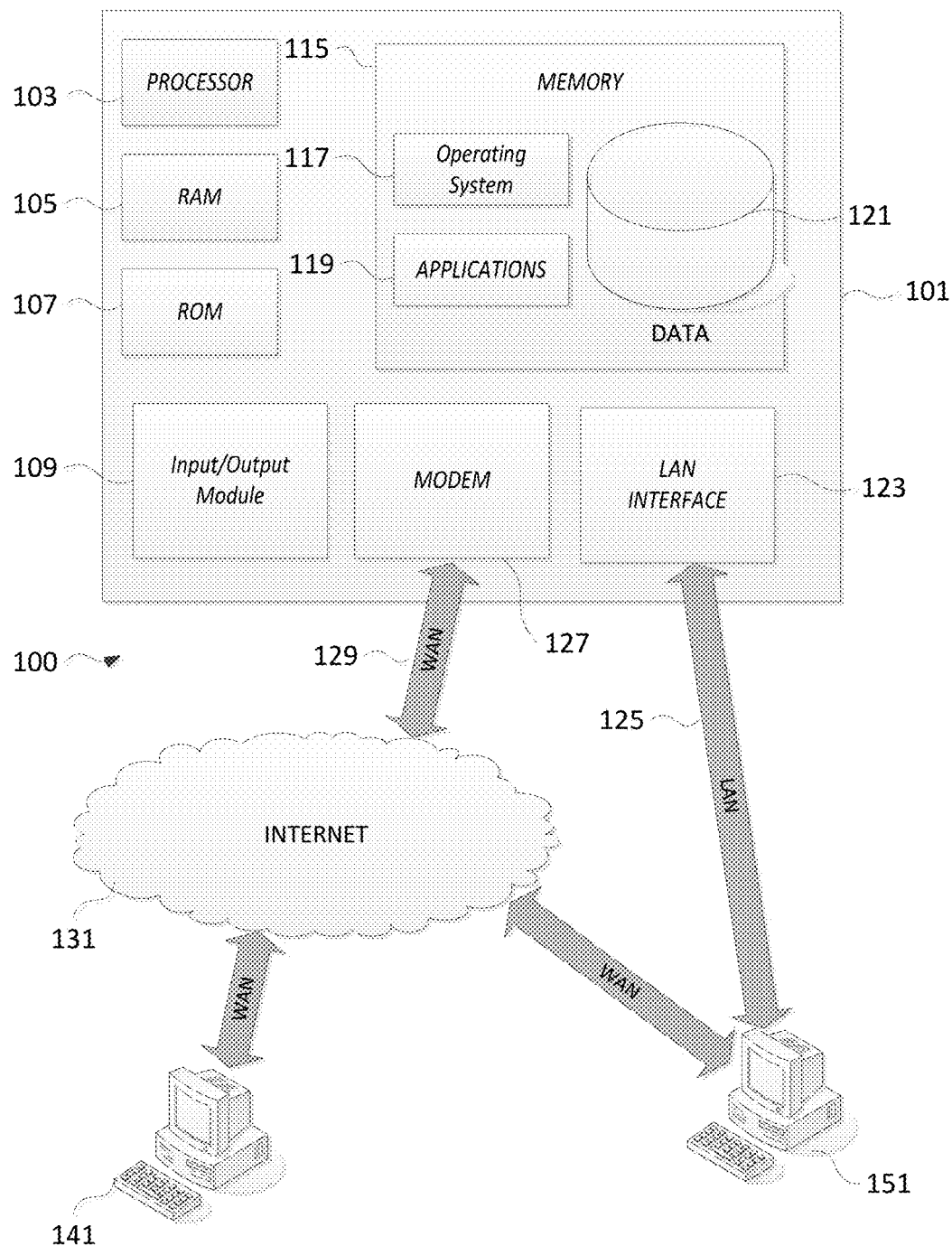
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100. In some aspects of the disclosure, computing system environment 100 may comprise a DB2 v10 architecture.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a server 101 wherein the processes discussed herein may be implemented. The server 101 may have a processor 103 for controlling the overall operation of the server 101 and its associated components, including random-access memory (RAM) 105, read-only memory (ROM) 107, communications module 109, and memory 115. Processor 103 and its associated components may allow the server 101 to run a series of computer-readable instructions related to receiving, storing, and analyzing data to determine an event's risk level.

Server 101 typically includes a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Communications module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 141 and 151. The computing devices 141 and 151 may be personal computing devices or servers that include many or all of the elements described above relative to the server 101.

The network connections depicted in FIG. 1 include a local area network (LAN) 125 and a wide area network (WAN) 129, but may also include other networks. When used in a LAN networking environment, server 101 may be connected to the LAN 125 through a network interface or adapter in the communications module 109. When used in a WAN networking environment, the server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate web pages.

Additionally, one or more application programs 119 used by the server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
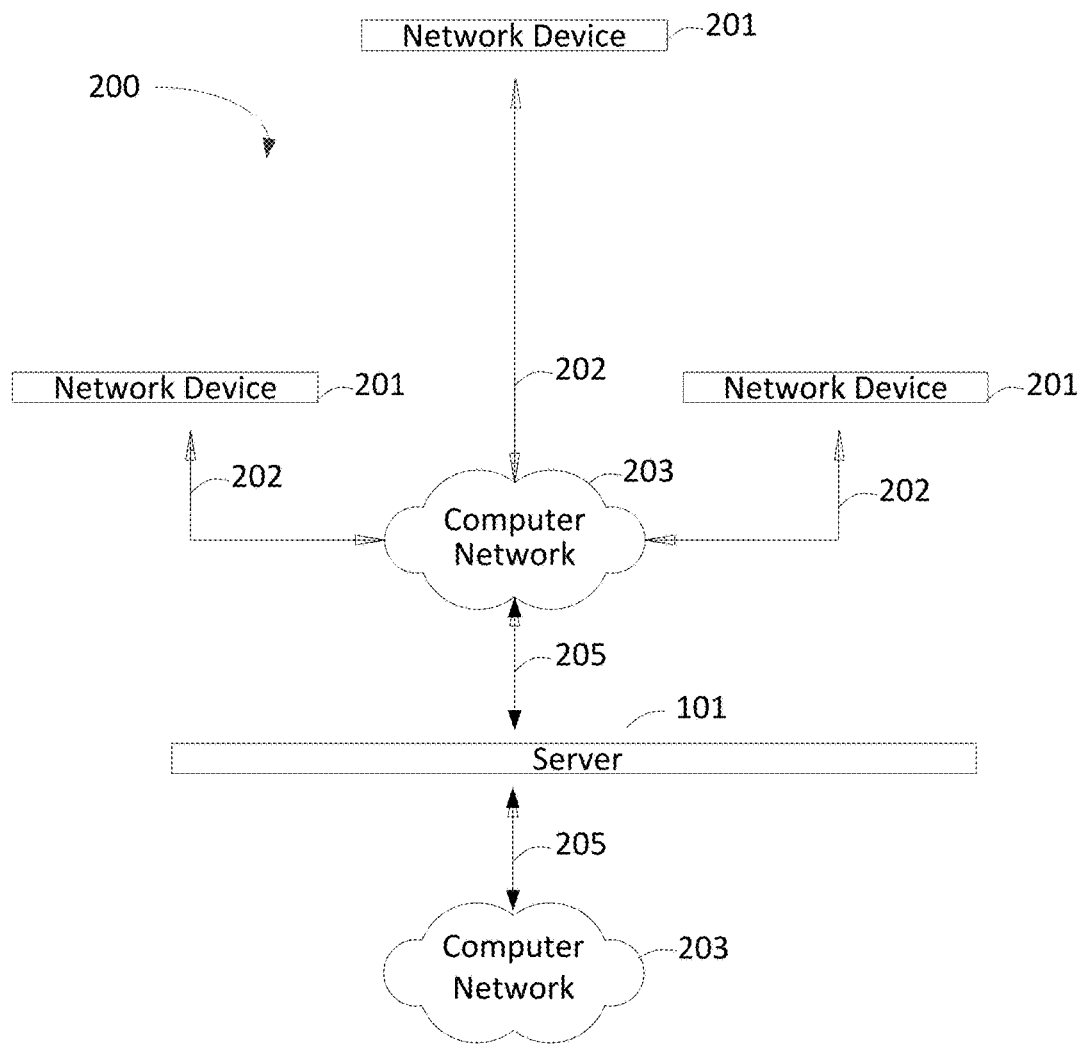
FIG. 2 shows an illustrative block diagram of workstations and servers that may be used to implement the processes and function of one or more aspects of the present disclosure.

FIG. 2 illustrates another example operating environment in which various aspects of the disclosure may be implemented. As illustrated, system 200 may include one or more workstations 201. Workstations 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more workstations 201 may be located within a branch office of a financial institution. Such workstations may be used, for example, by customer service representatives, other employees, and/or customers of the financial institution in conducting financial transactions via network 203. Additionally or alternatively, one or more workstations 201 may be located at a user location (e.g., a customer's home or office). Such workstations also may be used, for example, by customers of the financial institution in conducting financial transactions via computer network 203.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between workstations 201 and server 204, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

Figure 3:
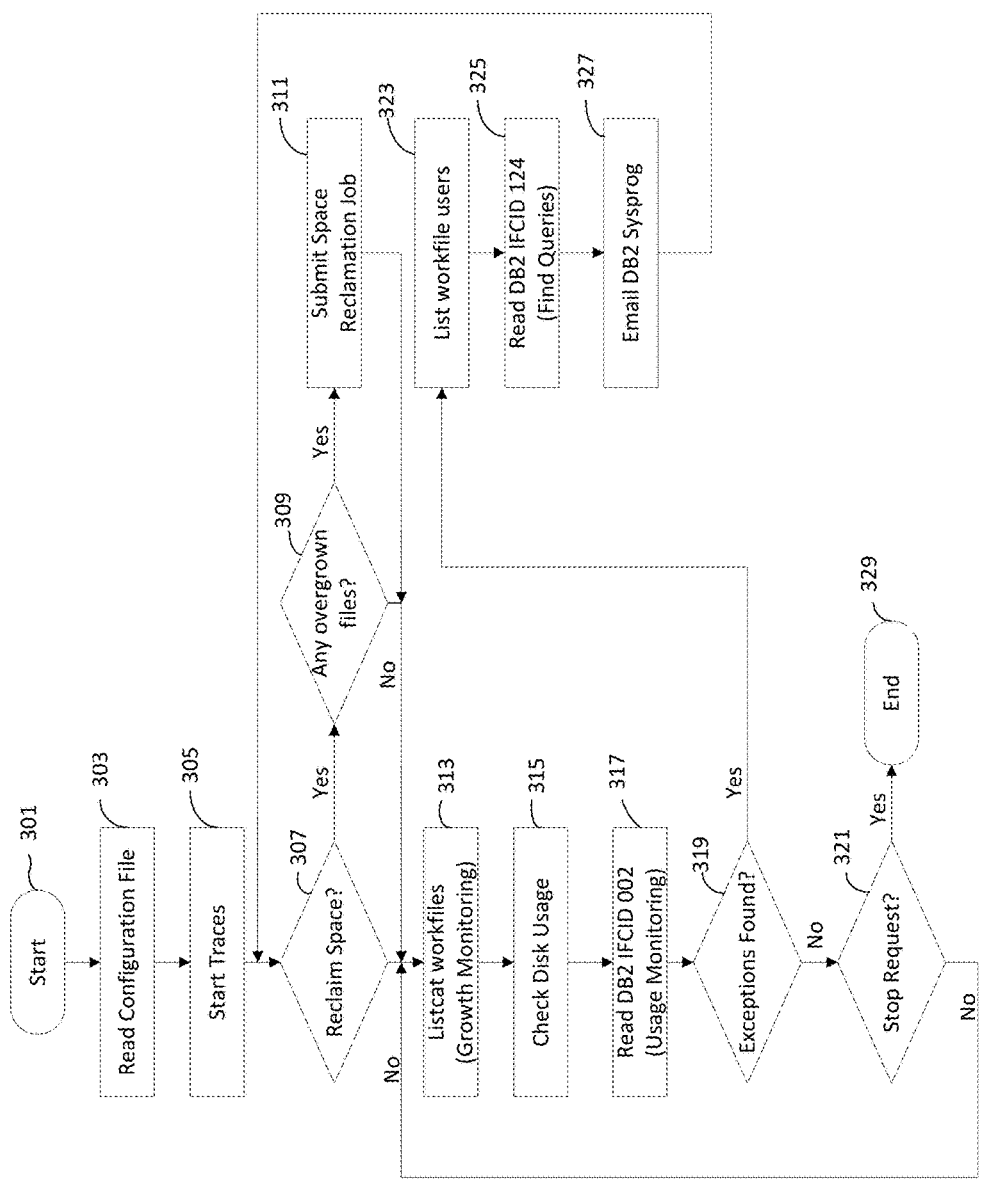
FIG. 3 shows an illustrative flow chart in accordance with aspects of the disclosure.

FIG. 3 illustrates an exemplary process map according to aspects of the disclosure. The process may start at step 301. In certain aspects, a user or a system programmer, at step 301, may execute a workfile monitoring module. The workfile monitoring module may comprise computer-executable program instructions stored on non-transitory computer-readable storage medium. For example, the computer-executable program instructions may be stored in memory 115. In some aspects the workfile monitoring module may be coded in Restructured Extended Executor (REXX) language, although another similar language may be used. An authorized user or system programmer may launch the workfile monitoring module using a computing device such as computing devices 141 and 151. Thereafter, processor 103 may execute the computer-executable program instructions stored in memory 115.

In certain aspects, the workfile monitoring module may receive monitoring information (e.g., from an authorized user or system programmer) at step 301. The monitoring information may include one or more of: names of workfiles to monitor, workfile threshold values, whether server 101 should reclaim space, and the like. The monitoring information may be written into a configuration file by processor 103 and stored at server 101, for example at memory 115.

At step 303, processor 103 may read the configuration file. By reading the configuration file, processor 103 may review the monitoring information entered by an authorized user or system programmer. For instance, an authorized user may input a workfile threshold value into the configuration file. The workfile threshold value may indicate the point at which an authorized user or system programmer may prefer to be notified about workfile usage. For example, an authorized user may input a workfile threshold value of 80 gigabytes into the configuration file. At step 303, processor 103 may read the configuration file and recognize that support staff should be alerted when the workfile usage in the system has reached a total of 80 gigabytes. The workfile usage may comprise the total amount of workfile space used by SQL queries. Thus, by reading the configuration file at step 303, server 101 may be able to ascertain the workfile threshold values for the system 200.

Similarly, processor 103 may read the configuration file to determine the name of the workfile database and calculate the predefined workfile capacity for system 200. The predefined workfile capacity is measured in terms of number of workfiles and total size of all workfile datasets. The predefined workfile capacity may have been previously defined by a system programmer or other system administrator. In a DB2 v8 system, workfile requests exceeding the predefined workfile capacity would fail. However, in a DB2 v10 system, workfiles may expand beyond the predefined workfile capacity and, if necessary, DB2 may automatically create additional workfile datasets, thereby increasing the number of workfile datasets. As an example, the predefined workfile capacity for system 200 may be 100 gigabytes, comprising 50 workfile datasets of 2 gigabytes each. Processor 103 may read the configuration file to determine that the predefined workfile capacity is 100 gigabytes, comprising 50 workfile datasets of 2 gigabytes each. Like the workfile threshold value above, the authorized user or system programmer may request that support staff be alerted when the workfile usage in the system 200 has met or exceeded the predefined workfile capacity or when DB2 creates a new workfile dataset. Processor 103 may recognize these preferences by reviewing the monitoring information when it reads the configuration file at step 303. As discussed further below, the configuration file may also contain monitoring information regarding steps to perform if the workfile usage exceeds the workfile threshold value or if DB2 creates new workfile datasets.

In certain aspects, server 101 may read the configuration file or files at step 303 after the workfile monitoring module is executed at step 301. After step 303, the process may continue to step 305. Server 101 may start traces at step 305. Traces are facilities that monitor and provide information to server 101 about the actions performed in system 200. The traces that may be run by server 101 include Instrumentation Facility Component Identifiers (IFCIDs). Specifically, the IFCIDs that may be run by server 101 include IFCID 002, IFCID 124, and in some instances, IFCID 342. Each of these traces will be discussed in greater detail below. It should be appreciated that other traces and IFCIDs may also be started at step 305.

After the traces have been started at step 305, server 101 may determine whether the configuration file includes a parameter to reclaim space at step 307. The parameter to reclaim space may be inputted to the configuration file by an authorized user at or prior to step 301. If a parameter to reclaim space is identified at step 307, server 101 may determine whether there are any overgrown files in system 200 at step 309. Overgrown files may comprise one or more workfile datasets that DB2 automatically creates to meet the workfile requirements of the queries. Overgrown files may cause the workfile capacity to exceed the predefined workfile capacity for system 200. These overgrown files may be particularly troublesome because by consuming large amounts of disk space, critical transactions in system 200 may fail as the DB2 v10 architecture expands the workfiles to the disk space capacity. The critical transactions may include updates to DB2 catalogs, tablespaces, datasets sharing the same DASD pool, and the like.

If at least one overgrown workfile is identified at step 309, server 101 may submit a space reclamation job at step 311. In some aspects, the space reclamation may be performed by server 101. In some other aspects, the space reclamation may be performed by another device. The space reclamation may be performed by server 101 or another device by dropping and recreating overgrown files detected at step 309. By dropping and recreating the overgrown files, the workfile capacity in system 200 may be returned to the predefined workfile capacity. For example, if the predefined workfile capacity for system 200 is 100 gigabytes comprising of 50 workfiles of 2 gigabytes each, at step 311, and DB2 creates 10 additional workfile datasets of 2 gigabytes each (thereby adding 20 gigabytes to the workfile capacity) to support the needs of SQL queries, server 101 may submit a space reclamation job to delete these additional workfile datasets created by DB2. But the space reclamation job may only be submitted if the configuration file includes a parameter to reclaim space at step 307 and overgrown files were detected at step 309.

If there is no parameter to reclaim space at step 307, or no overgrown files detected at step 309, or after a space reclamation job is submitted at step 311, the process may continue to step 313. At step 313, server 101 may run the LISTCAT or IGGCSI00 against workfile. The LISTCAT or IGGCSI00 workfile is a function that reports the dataset characteristics in a system. By running LISTCAT or IGGCSI00, server 101 may be able to monitor workfile growth in system 200 and may be able to determine specifics such how many workfiles are presently located in system 200, and the like. Thus, at step 313, server 101 may be able to determine the latest status of workfiles in system 200.

Following step 313, server 101 may check disk usage at step 315. This step may comprise determining, at server 101, the amount of free disk capacity available in system 200. In some aspects, processor 103 may determine the availability of free space in a disk pool and output a disk capacity alert when the free space availability drops below a predefined threshold.

After step 315, the process shown in FIG. 3 may continue to step 317. At step 317, processor 103 may read the IFCID 002 trace. IFCID 002 may provide the current utilization of the workfiles in system 200. In other words, server 101 may be able to determine the total workfile usage in system 200 by reading IFCID 002 at step 317. Similarly, server 101 may determine the amount of disk space available for further workfile usage, the amount of space available before the workfile usage reaches a workfile threshold value, the amount of space available before the workfile usage reaches the predefined workfile capacity, and the like. As an example, server 101 may read IFCID 002 to determine that the workfile usage in system 200 has consumed 10 gigabytes of the 100 gigabytes available in system 200. Therefore, server 101 may determine the latest workfile usage statistics by reading IFCID 002 at step 317.

In certain aspects, steps 313, 315, and 317 may be performed continuously by server 101. For instance, server 101 may run LISTCAT at step 313, check disk usage at step 315, and read IFCID 002 at step 317 at a regular interval 24 hours per day and seven days per week. In some aspects, all of the steps displayed in FIG. 3 may be performed continuously at one minute intervals. At step 319, server 101 determines whether any exceptions have been found in system 200. Server 101 determines whether any exceptions are found by comparing the workfile usage read at step 317 with the thresholds set in the configuration file. For example, server 101 may compare the workfile usage with the workfile threshold value set in the configuration file. Similarly, server 101 may compare the current workfile capacity with the predefined workfile capacity. If the workfile usage exceeds either or both the workfile threshold value and the predefined workfile capacity, server 101 may determine that an exception has been found at step 319, the process may continue to step 323. If no exception is found at step 319, server 101 may determine whether a stop request has been received. A stop request may be received from a system programmer or other authorized user requesting an end to the monitoring process illustrated in FIG. 3. Thus, if a stop request is received at step 321, the process will end at step 329. If no stop request is received at step 321, the process may loop back to step 313 to continue the workfile monitoring process.

Server 101 may output an alert when an exception is found at step 319. The alert may be output to network devices 141 and 151 and may be accessible by system programmers, support staff, or other authorized users. If one or more exceptions are found at step 319, server 101 may list workfile users at step 323. During step 323, processor 103 may list all users in system 200 that are using at least one workfile. The list may be written and saved in memory 115 (for example, at database 121). After the workfile users are listed at step 323, server 101 may read IFCID 124 trace. The IFCID 124 trace may be used to determine and list the SQL queries using the workfiles in system 200. In other words, IFCID 124 may provide an SQL statement record in system 200. If the configuration file at step 307 includes a parameter to generate more granular workfile usage reports, server 101 may start and read the IFCID 342 trace The SQL query information, along with the listed workfile users, may then be emailed to a DB2 system programmer at step 327. Thereafter, the process may return to step 307.

A GUI interface at, for example, network device 141 may enable a system programmer to manually perform certain functions described above. For instance, a system programmer or other authorized user may be able to manually start traces at step 305, reclaim space at step 311, and the like manually via network device 141. Furthermore, a system programmer or other authorized user may be able to request other traces, such as IFCID 342, be run in system 200. IFCID 342 may provide information similar to that provided by IFCID 124 in a more granular fashion, requiring more CPU and outputting larger amounts of data. Thus in some aspects, IFCID 342 may not be run automatically, but may be run by request from a system programmer. Moreover, in certain aspects, configuration files may be adjusted via console commands (e.g., at network device 141) without requiring that the system be restarted. Thus, the disclosed system may perform automatic workfile monitoring with the added benefit of optional manual control.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks or tapes.

What is claimed is:

1. A computer-implemented method, comprising:
   receiving, at a processor, a configuration file comprising a plurality of workfile threshold values;
   monitoring, at the processor, workfile usage in a database management system, wherein the workfile usage comprises a total amount of workfile space used by SQL queries, a number of workfiles created by the database management system, and a total amount of disk capacity utilized by workfiles;

comparing, at the processor, the plurality of workfile threshold values with the workfile usage to determine whether the workfile usage has reached at least one of the plurality of workfile threshold values;

determining, at the processor, that a parameter to reclaim space was included in the configuration file;

determining, at the processor, whether the database management system comprises at least one overgrown workfile, wherein the overgrown workfile comprises at least one workfile dataset created by the database management system; and outputting, at the processor, a threshold alert when the workfile usage has reached the at least one workfile threshold value.

2. The method of claim 1, further comprising submitting, at the processor, a space reclamation job, wherein the submitting is performed after determining that the database management system comprises at least one overgrown workfile.

3. The method of claim 1, further comprising determining, at the processor, an availability of free space in a disk pool.

4. The method of claim 1, further comprising generating, the processor, a list of workfile users.

5. The method of claim 1, wherein the monitoring is performed using traces.

6. The method of claim 5, wherein the traces comprise at least one of IFCID 002 and IFCID 124.

7. A non-transitory computer-readable storage medium having computer-executable program instructions stored thereon that, when executed by a processor, cause the processor to:

receive a configuration file comprising a plurality of workfile threshold values;

monitor the workfile usage in a database management system, wherein the workfile usage comprises a total amount of workfile space used by SQL queries, a number of workfiles created by the database management system, and a total amount of disk capacity utilized by workfiles;

compare the plurality of workfile threshold values with the workfile usage to determine whether the workfile usage has reached at least one the workfile threshold values;

determine, at the processor, that a parameter to reclaim space was included in the configuration file;

determine, at the processor, whether the database management system comprises at least one overgrown workfile, wherein the overgrown workfile comprises at least one workfile dataset created by the database management system; and output a threshold alert when the workfile usage has reached the at least one workfile threshold value.

8. The transitory computer-readable storage medium of claim 7, wherein the instructions further cause the processor to submit a space reclamation job after determining that the database management system comprises at least one overgrown workfile.

9. The transitory computer-readable storage medium of claim 7, wherein the instructions further cause the processor to determine whether there is free space available in a disk pool used by workfiles and output a disk capacity alert when the free space availability drops below the workfile threshold.

10. The transitory computer-readable storage medium of claim 7, wherein the instructions further cause the processor to generate a list of workfile users.

11. The transitory computer-readable storage medium of claim 7, wherein the monitoring is performed using traces.

12. An apparatus comprising:

a memory;

a processor, wherein the processor executes computer-executable program instructions which cause the processor to:

receive a configuration file comprising a plurality of workfile threshold values;

monitor the workfile usage in a database management system, wherein the workfile usage comprises a total amount of workfile space used by SQL queries, a number of workfiles created by the database management system, and a total amount of disk capacity utilized by workfiles;

compare the plurality of workfile threshold values with the workfile usage to determine whether the workfile usage has reached at least one of the plurality of workfile threshold values;

determine, at the processor, that a parameter to reclaim space was included in the configuration file;

determine, at the processor, whether the database management system comprises at least one overgrown workfile, wherein the overgrown workfile comprises at least one workfile dataset created by the database management system; and output a threshold alert when the workfile usage has reached the at least one workfile threshold values.

13. The apparatus of claim 12, wherein the instructions further cause the processor to submit a space reclamation job after determining that the database management system comprises at least one overgrown workfile.

14. The apparatus of claim 12, wherein the instructions further cause the processor to determine whether there is free space available in a disk pool used by workfiles and output a disk capacity alert when the free space availability drops below the workfile threshold.

15. The apparatus of claim 12, wherein the instructions further cause the processor to generate a list of workfile users.

16. The apparatus of claim 12, wherein the monitoring is performed using traces.

17. The apparatus of claim 16, wherein the traces comprise at least one of IFCID 002 and IFCID 124.

* * * * *